United States Patent

[11] 3,543,956

| [72] | Inventors | Yukio Furuno;<br>Hiroshi Tokuno; Katsusuke Murata, Ise-shi, Japan |
|---|---|---|
| [21] | Appl. No. | 708,615 |
| [22] | Filed | Feb. 27, 1968 |
| [45] | Patented | Dec. 1, 1970 |
| [73] | Assignee | Shinko Denki Kabushiki Kaisha<br>Tokyo, Japan<br>a corporation of Japan |

[54] LOAD CARRYING VEHICLE
6 Claims, 4 Drawing Figs.

[52] U.S. Cl. ..................................................... 214/141
[51] Int. Cl. ......................................................... B66f 9/06
[50] Field of Search .......................................... 214/768, 770, 774, 132, 141, (Coil, Ring & Perforated Article Handling)(Unoff.), 730, 731

[56] References Cited

UNITED STATES PATENTS

| 2,348,899 | 5/1944 | Guignard et al. | 214/731X |
| 2,980,271 | 4/1961 | Ulinski | 214/770 |
| 3,323,664 | 6/1967 | Loef et al. | 214/730X |

FOREIGN PATENTS

| 242,511 | 1/1963 | Australia | 214/770 |

*Primary Examiner*—Hugo O. Schulz
*Attorney*—Larson and Taylor & Hinds

ABSTRACT: A load carrying vehicle wherein parallel lift arms are pivotally provided on a revolving table on a chassis on the forward end of said parallel lift arms being pivotally mounted directly or through a support frame a support table with a load support arm such as a rotatable ram or fork, said load support arm being capable of advancing or receding at least with said support table and the lift arms.

Patented Dec. 1, 1970

LOAD CARRYING VEHICLE

This invention relates to a load carrying vehicle comprising load support arm such as a ram or a fork and capable of performing various loading and transporting operations by supporting load with said support arms.

The object of this invention is to provide a load carrying vehicle which is capable of performing loading, unloading and arranging operations of merchandise while moving in a wide range, desirably in the forward and rearward and left and right directions about the vehicle while the vehicle remains in a stationary position; and which can also change the direction which the load faces on the vehicle, thereby realizing effective loading as well as elevating efficiency in a loading operation.

An embodiment of this invention will now be described with reference to the accompanying drawing, in which.

Figure 1:
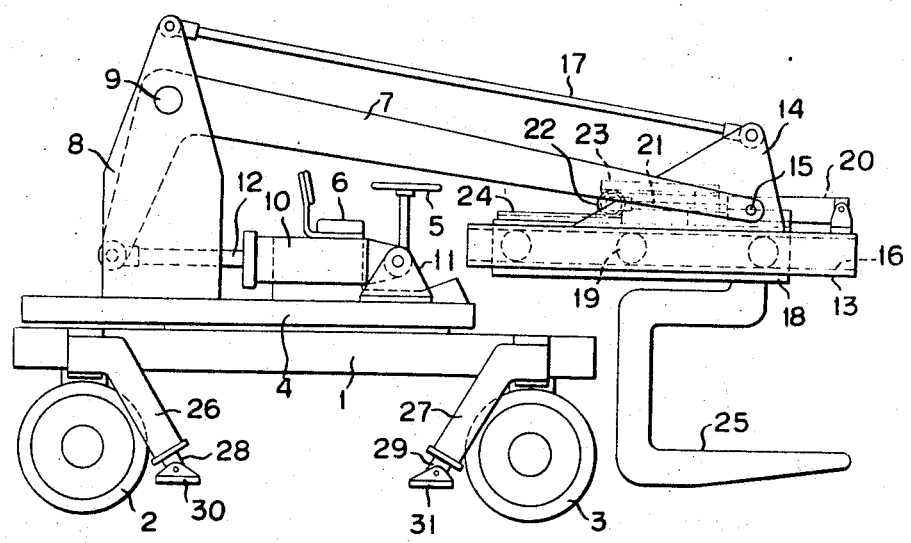
FIG. 1 is a side view showing an embodiment of this invention.
Figure 2:
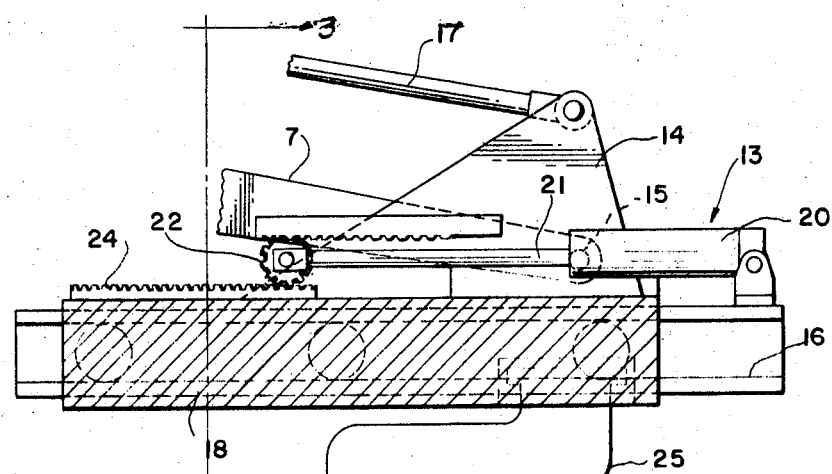
FIG. 2 is an enlarged schematic view of a portion of FIG. 1 taken through the center of the device in a plane parallel to the plane of the paper.
Figure 3:
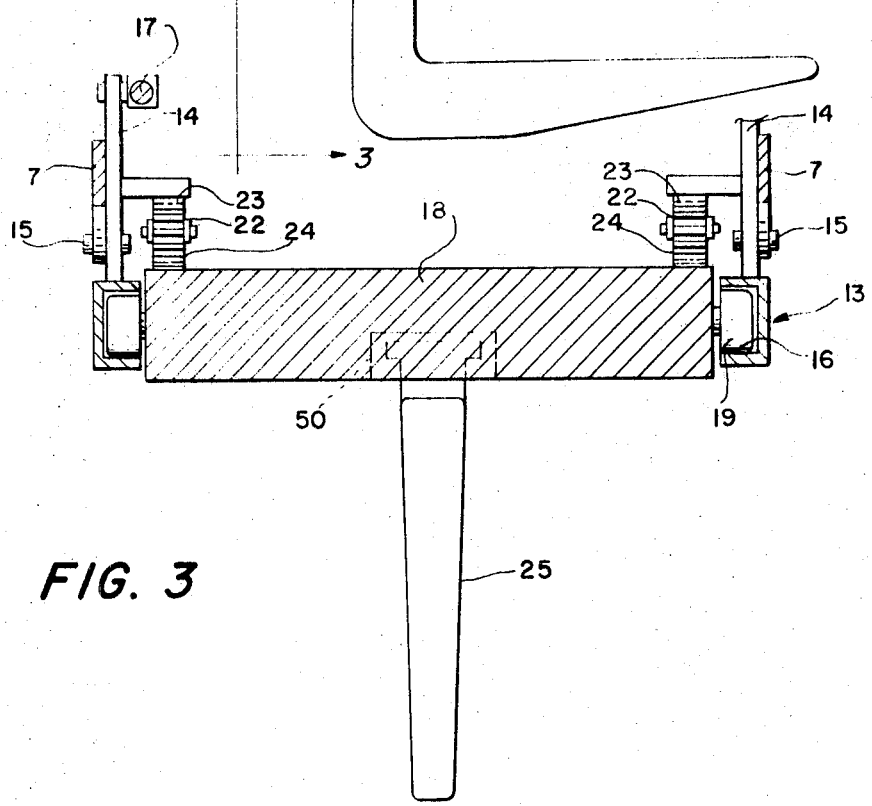
FIG. 3 is a cross-sectional view taken along line 3–3 of FIG. 2.

Referring now to FIGS. 1—3, 1 is a chassis. 2 is an idler wheel. 3 is a drive wheel which is driven through a speed reduction mechanism by an oil pressure motor or a motor (not shown) provided under the chassis 1. 4 is a revolving table revolvably provided on the chassis 1 through thrust ball bearing, said revolving table being capable of revolving through an angle of 360° in a horizontal plane by increasing the revolving force by means of a speed reduction mechanism. 5 is a steering handle which operates steering by revolving the idler wheel 2 with the aid of a hydraulic power steering means (not shown). 6 is an operator's seat. 7 is a lift arm in the form of the L-shape, a curved part of which 70 supported by a shaft 9 to support means 8 and thereby it is inclined upwardly and forwardly. The support means 8 is secured to the revolving table 4. 10 is a lift cylinder pivoted or a bracket 11 fixed on the revolving table 40. The rear end of the piston rod 12 of the lift cylinder is pivoted on the forward end of the foot of the lift arm 7. 13 is a support frame, and the lower part of a connecting member 14 is secured to the upper surface thereof. The forward end of the lift arm 7 is pivotally connected to member 14 by a shaft 15. 17 is a lift arm or a link pivoted on the upper end of the support 8 and the upper end of the connecting member 14, said link being in parallel with the lift arm 7 and thus serving to hold the support frame 13 horizontally at all times relative to the road surface when the lift arm 7 is rising or falling. 18 is a support table for including means 50 for rotatably supporting a load support arm 25 on the sides of which a plurality of rollers 19 are disposed laterally in a line. Elements 13 and 18 are referred to collectively as a support member. Said support table can be moved forward and backward (left to right as viewed in FIG. 1) along the guide rail 16. 20 is a reach cylinder pivoted on the forward end of the support frame 13. An axis pin, on which the pinion 22 is rotatably mounted, is attached to the forward end of the piston rod 21. 23 is a rack secured to the support frame 13 and engaging with the upper part of the pinion 22. 24 is a rack secured to the support table 18 and engaging with the lower part of the pinion 22. The load support arm 25, according to the embodiment, is as shown in FIG. 1, the portion other than the upper connecting part being formed in a ⊐-shape. The load support arm 25 is rotatably mounted on the support table 18 and is capable of rotating around a vertical axis (as shown in FIG. 1) to change its facing direction through thrust ball bearing (not shown) on the said upper connecting part. It may be rotated by any conventional means such as an oil pressure motor (not shown) provided on the support table 18. 26 and 27 are stabilizing means provided on the fore and rear sides of the chassis 1, in which oil pressure cylinders are employed in an inclined manner. On the outer end of each piston rod 28 and 29 is provided earth plates 30 and 31. In use, after the oil pressure cylinders are revolved to the side of the chassis and turned sidewards, the piston rods 28 and 29 are extended to ground the earth plates 30, 31 in order to stabilize the vehicle during loading so as to prevent the vehicle from turning laterally by the weight of a load suspended on one side of the vehicle.

One of the embodiments of this invention is so constructed that by operating a handle and the like provided on an operator's seat on the revolving table 4 and operating the oil pressure motor for driving the revolvable table 4 (not shown), it is possible to revolve the lift arm 7 in a desired direction around the vehicle and by feeding compressed oil into the lift cylinder 10 to extend or contract the piston rod, the lift arm 7 may be turned upward in a desired angle, whereupon the lift arm 7 and the link 17 form a parallel linkage so that when the lift arm 7 turns upward, the support frame 13 is held horizontal relative to the road surface and raised or lowered by the action of the lift arm. By operation of the operating lever, the reach cylinder 20 is supplied pressure oil and its piston rod is extended or contracted, whereby a rack 23 in engagement with a pinion 22 on the end of the piston rod 21 is fixed securely to the support frame 13. The support table 18 on which another rack 24 is secured advances or recedes with the load support arm 25 along the guide rail 16 in a stroke twice as large that of the piston rod 21. Further, by operating the oil pressure motor (not shown) on the support table 13, the load support arm 25 changes its facing direction as desired in an the angle of 360°.

Figure 4:
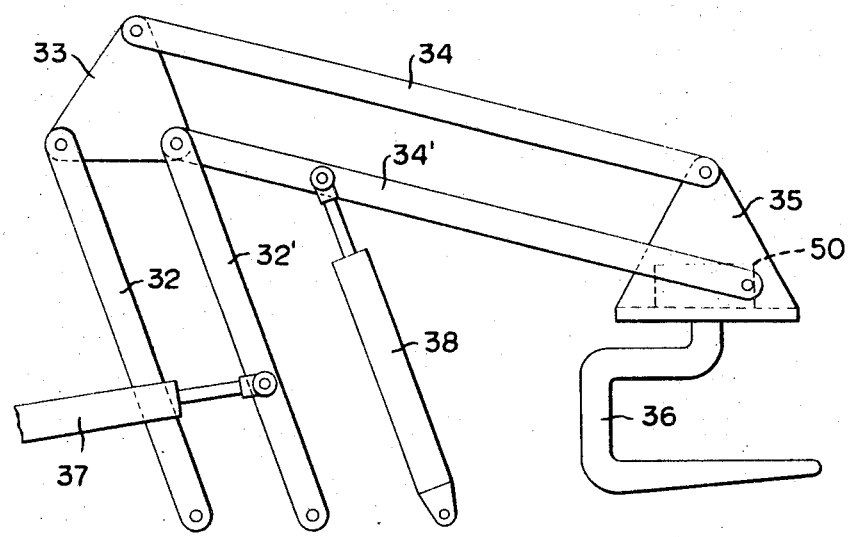
FIG. 4 is a partial view showing another embodiment of this invention.

FIG. 4 is a partial view of another embodiment. In the FIG. 32, 32' are parallel rod lift arms, each lower end of which is pivoted on a revolving table not shown corresponding to the revolving table 4 described above in FIG. 1 and each upper end of which is pivoted on a connecting frame 33 so that there may be formed a parallelogram by connecting these four pivot points. Pivot rod lift arms 34, 34' have one end of each pivoted on the connecting frame 33 and the other end pivoted on the support member 35 so that there may be formed a parallelogram by connecting these four-pivot points. 36 is a load support arm mounted revolvably on the support member 35. The embodiment shown applies to the case of a ram. As shown in the embodiment of FIG. 1, the load support arm is formed so that it can turn revolvably to face a desired direction in the range of 360° on a horizontal plane by oil pressure motor and the like provided on a support table 35. 37 is a hydraulic cylinder for projecting and is pivoted at one end on a parallel rod 32 and at its other end on the revolvable table, not shown, but equivalent to the revolving table 4 of FIG. 1. 38 is a hydraulic cylinder for lifting and is pivoted at one end on a parallel left arm 34' and is pivoted at its other end on the said revolving table.

In such construction, if the hydraulic cylinder 37 is actuated and its piston rod is extended or contracted, the parallel rods 32, 32' are turned about their pivot points. By means of parallel linkage, the parallel lift arms 34, 34' and the load support arm 36 take the same posture and are extended or contracted and if the hydraulic cylinder 38 is actuated and its piston rod is extended or contracted, the parallel lift arms 34, 34' turn about their pivot points causing rising and falling operation of the load support arm 36, whereupon the load support arm 36 rises or falls in a horizontal posture relative to the road surface by the parallel linkage of the parallel lift arms 34 and 34'.

Thus, in the case of the second embodiment, as in the first one, the load support arm 36 can work rising and falling operations and projecting or advancing and receding operations in a horizontal posture relative to the road surface and is turned to desired direction in a range of 360° relative to the horizontal surface.

In this invention, a lift arm is provided on the revolvable table on the chassis as described above, the free end of said lift arm being provided with a parallel linkage so that the support table supporting the load support arm such as ram and fork may be horizontal with the road surface at all times, and a load support arm may turn to face the desired direction in a horizontal posture while said support arm is movable desirably with the support table directly supporting the support arm or with the support table and the lift arms so that it is possible to change the position and height of the load support arm around the vehicle, while the direction of movement of the vehicle in advancing and receding and moving in lateral direction and also the load support arm may be maintained in a fixed direction suitable for loading operation without being inclined when the vehicle is changed in height or advances or recedes in movement.

It is therefore possible to load or unload merchandise desirably in forward and rearward and left and right directions with the vehicle not being moved or revolved but in stationary position or it can take off the merchandise from a desired direction by revolving the load support arm in proper direction. Furthermore, the merchandise loaded on the vehicle can also be handled simply by revolving the support arm in proper operation, which will make the vehicle adequate for working in a narrow warehouse or ship hull in which space is extremely limited. Particularly in corners of a ship hull, the conventional forklift trucks had difficulty of loading or unloading merchandise due to its impossibility of close access to walls or free turning of the vehicle. The vehicle according to this invention facilitates such operation by suitable revolution of the lift arm and the load support arm and adequate advancing and receding as well as rising and falling movement on the support arm, resulting in greater efficiency assured in loading operation. This mechanism sufficiently fulfills most of functions of other load carrying vehicles each having single ability of operation and this characteristic of the invention is more advantageous in efficiency of operation.

We claim:

1. A load carrying vehicle including a revolving table connected to the vehicle chassis by a first connecting means for rotation relative to the chassis, support means mounted on said table, a support member, a second connecting means connecting said support means to said support member and including parallel lift arms pivotally connected at one end to said support means and at their other ends to the said support member, whereby, turning the lift arms about said pivot connections the support member can be raised and lowered while retaining the angular relationship thereof relative to the ground, a load support arm, a third connecting means rotatably connecting the load support arm to said support member for rotation about a generally vertical axis, advancing means for advancing and retracting said load support arm horizontally relative to the vehicle chassis, said first, second and third connecting means and said advancing means being operable independently of each other so that the load support arm can undergo, at any moment, movement in a direction about the vehicle chassis vertically, towards to away from the chassis, or rotational movement about a vertical axis passing therethrough.

2. A load carrying vehicle according to claim 1 wherein the said support means is rigidly fixed to the said revolving table.

3. A load carrying vehicle according to claim 1 wherein said advancing means comprises parallel rods pivotally mounted to the revolving table and to the support means.

4. A load carrying vehicle according to claim 1 wherein said support member includes a support frame and a support table, the load support arm being connected to the support table for rotational movement about a vertical axis passing through the load support arm, and said advancing means comprising the means connecting the support table to the support frame wherein the support table is slideable in a horizontal plane relative to the said support frame.

5. A load carrying vehicle according to claim 4 wherein the advancing means comprises a pinion and two racks each engaged with said pinion, one of said racks rigidly fixed to the support frame and the other rack rigidly fixed to the said support table, whereby rotation of the pinion causes relative linear movement between the support frame and the support table.

6. A load carrying vehicle according to claim 5 including a piston connected to the pinion to move the same linearly, such that upon movement of the piston, the support table moves twice the distance moved by the piston.